United States Patent
Fujii et al.

(10) Patent No.: US 8,456,742 B2
(45) Date of Patent: Jun. 4, 2013

(54) OPTICAL COMPONENT MANUFACTURING METHOD, AND LENS, LENS UNIT AND CAMERA MODULE

(75) Inventors: Yuiti Fujii, Hino (JP); Atsushi Naito, Sagamihara (JP); Tohru Tominami, Machida (JP); Kazuhiro Wada, Hachioji (JP); Hajime Mori, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 44 days.

(21) Appl. No.: 13/121,283

(22) PCT Filed: Aug. 17, 2009

(86) PCT No.: PCT/JP2009/064389
§ 371 (c)(1),
(2), (4) Date: Mar. 28, 2011

(87) PCT Pub. No.: WO2010/038554
PCT Pub. Date: Apr. 8, 2010

(65) Prior Publication Data
US 2011/0176217 A1   Jul. 21, 2011

(30) Foreign Application Priority Data
Sep. 30, 2008  (JP) .................................. 2008-254448

(51) Int. Cl.
*G02B 27/10*  (2006.01)

(52) U.S. Cl.
USPC .......................................... 359/619; 359/622

(58) Field of Classification Search
USPC ......................................................... 359/622
See application file for complete search history.

(56) References Cited

U.S. PATENT DOCUMENTS

| 2004/0212719 A1* | 10/2004 | Ikeda ............................ 348/340 |
| 2011/0037997 A1* | 2/2011 | Karszes et al. ............... 358/1.15 |

FOREIGN PATENT DOCUMENTS

| JP | 2002-46046 | 2/2002 |
| JP | 2002-290842 | 10/2002 |
| JP | 2003-84243 | 3/2003 |
| JP | 2004-229167 | 8/2004 |
| JP | 2004-256381 | 9/2004 |

\* cited by examiner

*Primary Examiner* — James Jones
(74) *Attorney, Agent, or Firm* — Cozen O'Connor

(57) ABSTRACT

Provided is an optical component manufacturing method wherein various types of information, including information relating to each optical component, can be relatively easily printed on each optical component, even in the case where a plurality of optical components are manufactured in a batch. A lens, a lens unit and a camera module manufactured by using such method are also provided. Prior to dividing camera modules into individual camera modules, a pattern to be printed on each camera module, i.e., printing contents determined based on information on a first lens array or the like after formation, is printed on the surface of the first lens array at one time. Thus, information specific to each camera module can be printed even by the relatively simple method.

13 Claims, 9 Drawing Sheets

OPTICAL COMPONENT MANUFACTURING METHOD, AND LENS, LENS UNIT AND CAMERA MODULE

RELATED APPLICATIONS

This application is a U.S. National Phase Application under 35 USC 371 of International Application PCT/JP2009/064389 filed Aug. 17, 2009.

This application claims the priority of Japanese application No. 2008-254448 filed Sep. 30, 2008, the entire content of which are hereby incorporated by reference.

TECHNICAL FIELD

The present invention relates to a manufacturing method for an optical component, and a lens, lens unit and camera module which are made by the manufacturing method.

BACKGROUND ART

One of the techniques known in the conventional art is a camera module manufacturing method by which a lens array is stuck on a surface of an image sensor wafer, on which a plurality of image sensor chips are arranged in a matrix, wherein the lens array is provided with lenses each of which is arranged so as to correspond to each of the image sensor chips, and each image sensor chip and a lens corresponding thereto are cut out to be formed into one camera module (refer to Patent Literature 1).

PRIOR ART LITERATURE

Patent Literature

Patent Literature 1: Japanese Unexamined Patent Application Publication No. 2004-229167

DISCLOSURE OF THE INVENTION

Generally, the manufactured product is preferably provided with as detailed manufacturing information as possible. As described above, in the collective production of a plurality of optical components such as camera modules by dividing one wafer or the like, each of divided optical components is preferably equipped with various forms of information including inherent manufacturing information.

However, when multiple optical components are to be manufactured at one time, greatly complicated work in the manufacturing process is involved in the separate management of the product information and printing of such information on each of the optical components.

In view of the problems described above, it is an object of the present invention to provide a method for manufacturing optical components wherein, even in collective production of a plurality of optical components, various forms of information including the information on individual optical components can be printed on each of the optical components with relative ease, as well as a lens, lens unit and camera module that are manufactured using the aforementioned method.

To solve the aforementioned problems, a method for manufacturing optical components in the present invention is (a) a manufacturing method of dividing a laminated optical component array including a lens array having a plurality of lenses arranged thereon into individual optical components to be taken out, which includes, (b) a lens army molding step for molding a lens array from an optical material, (c) an array laminating step for procuring an optical component array by attaching the lens array on another lamination component, (d) an array dividing step for dividing the optical component array into individual components, and (e) a pattern printing step for printing the pattern including the information related to each lens in the lens array on the non-optical surface of the aforementioned each lens, in the steps from the lens array molding step to the array dividing step.

In the aforementioned optical component manufacturing method, the pattern including the information on each lens in the lens array is printed on the non-optical surface of the aforementioned each lens, from the lens array molding step to the array dividing step. This allows the pattern to be printed on the non-optical surface of each lens after various forms of information including the information on individual optical components have been obtained, before each of the optical components is divided from one another. In this case, therefore, the information of each of the optical components can be printed collectively on the surface of the lens array, for example. This ensures that various forms of information including the information on the individual optical components can be indicated on each of the optical components with relative ease.

In a specific embodiment of the present invention, (a) the optical component array includes (a1) a first lens array as an lens array, and (a2) a second lens array as another lamination component having a plurality of lenses corresponding to each lens of the first lens array, and (b) in the pattern printing step, the pattern including the information on each lens unit corresponding to the each lens is printed on the non-optical surface of each lens of at least one of the first and second lens arrays. In this case, the information on each lens unit formed by dividing the optical component array including the first and second lens arrays can be printed on the non-optical surface of any of the lenses constituting each of the aforementioned lens units with relative ease.

In another specific embodiment of the present invention, (a) the optical component array includes (a1) the lens array, and (a2) an image sensor wafer as another lamination component provided with a plurality of image sensor chips corresponding to each lens of the lens array and constituting each camera module in collaboration with the aforementioned each lens, and (b) in the pattern printing step, the pattern including the information on each camera module corresponding to each lens is printed on the non-optical surface of each lens of the lens array. In this case, the information on each camera module formed by dividing the optical component array including the lens array and image sensor wafer can be printed on the non-optical surface of the lens constituting each of the aforementioned camera modules with relative ease.

In still another specific embodiment of the present invention, the optical component array is formed by further stacking a filter member for cutting off the incident light in a prescribed wavelength region. In this case, for example, the unwanted parts of the light passing through the optical components can be removed by this filter member.

In a further embodiment of the present invention, in the pattern printing step, the pattern including various pieces of information is printed by applying resin to the non-optical surface of each lens and curing the resin. In this case, the pattern printing can be accomplished with relative ease by application and curing of the aforementioned resin.

In a still further embodiment of the present invention, in the pattern printing step, the pattern including various pieces of information is printed by laser-processing of the non-optical surface of each lens. In this case, high-precision and reliable pattern printing is provided by the laser-processing.

In a still further embodiment of the present invention, the information printed on the non-optical surface of each lens in the pattern printing step includes the information obtained in at least one of the lens array molding step and array laminating step. In this case, the information inherent to each lens determined in the manufacturing step can be included in the pattern to be printed.

In a still further embodiment of the present invention, the information printed on the non-optical surface of the lens in the pattern printing step includes the information on the layout position of each lens in the lens array. In this case, the information on the layout position and orientation of each lens in the lens array as the information inherent to each lens can be included in the printed pattern.

In a still further specific embodiment of the present invention, having been formed by any one of the aforementioned methods for manufacturing the optical component, the lens of the present invention contains the pattern including the information on each lens as its own manufacturing information. In this case, the manufacturing information is indicated on each lens formed by being divided.

In a still further specific embodiment of the present invention, the lens unit of the present invention is manufactured by any one of the aforementioned methods for manufacturing the optical components, whereby the pattern including the information on each lens is possessed as its own manufacturing information. In this case, each lens unit formed by being divided indicates the manufacturing information of each.

In a still further specific embodiment of the present invention, the camera module of the present invention is manufactured by any one of the aforementioned manufacturing methods, whereby the pattern including the information on each lens is possessed as its own manufacturing information. In this case, the camera module produced by being divided into respective pieces indicates each of manufacturing information.

BEST MODE FOR CARRYING OUT THE INVENTION

Figure 1A:
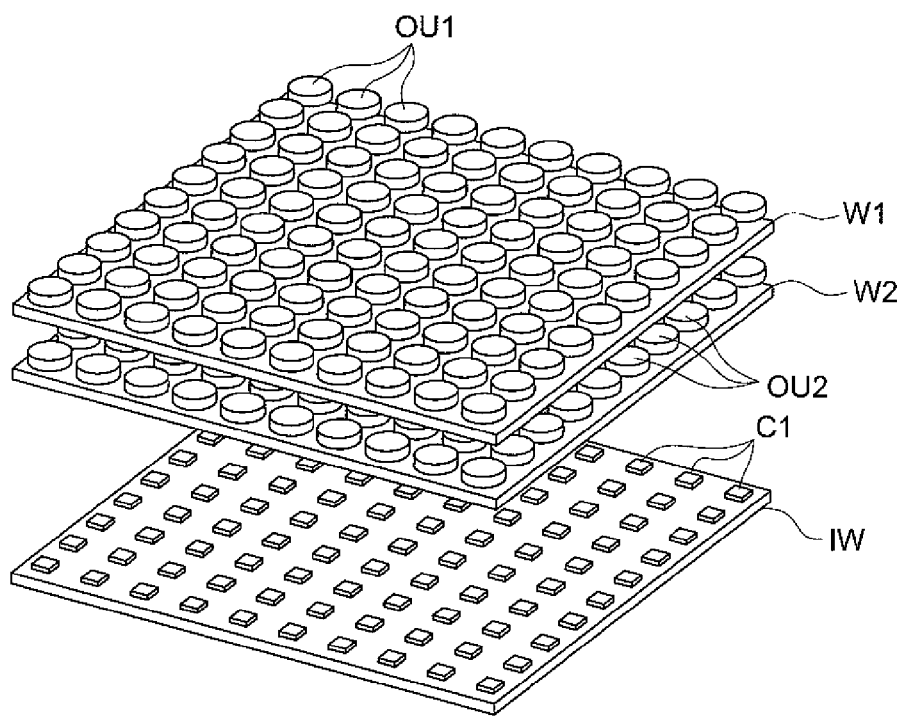
FIGS. 1A and 1B are perspective views representing the step of manufacturing a camera module including a lens unit in the first embodiment.
Figure 1B:
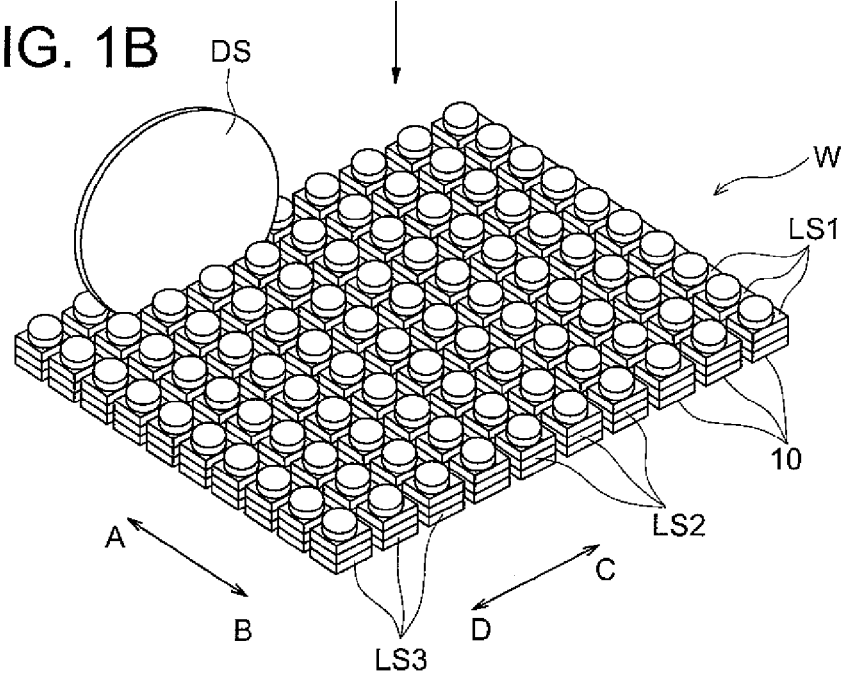
Figure 2:
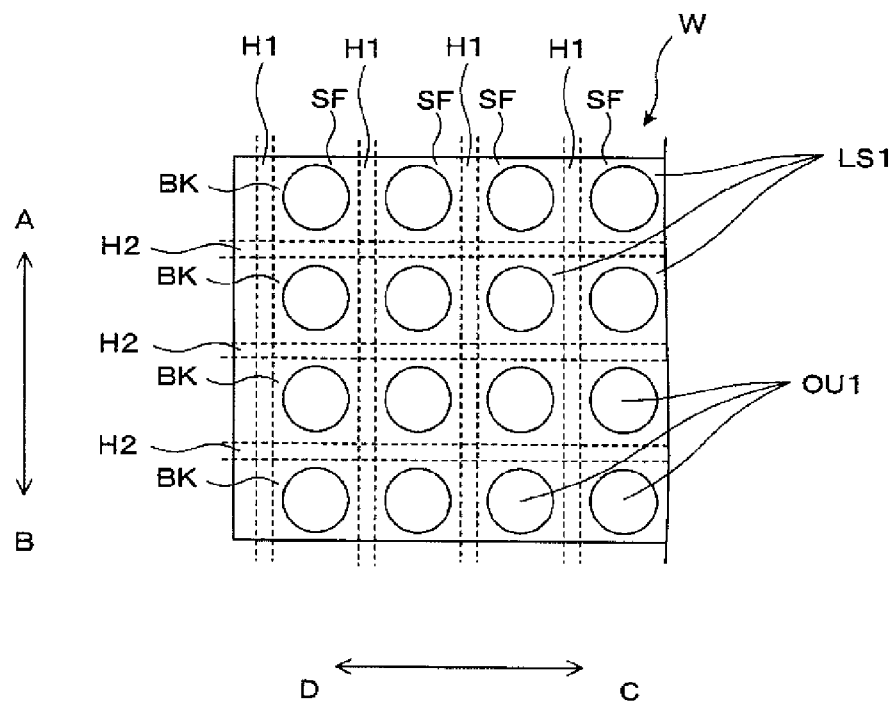
FIG. 2 is a plan view representing the array dividing step for dividing the optical component array into respective components.
Figure 3:
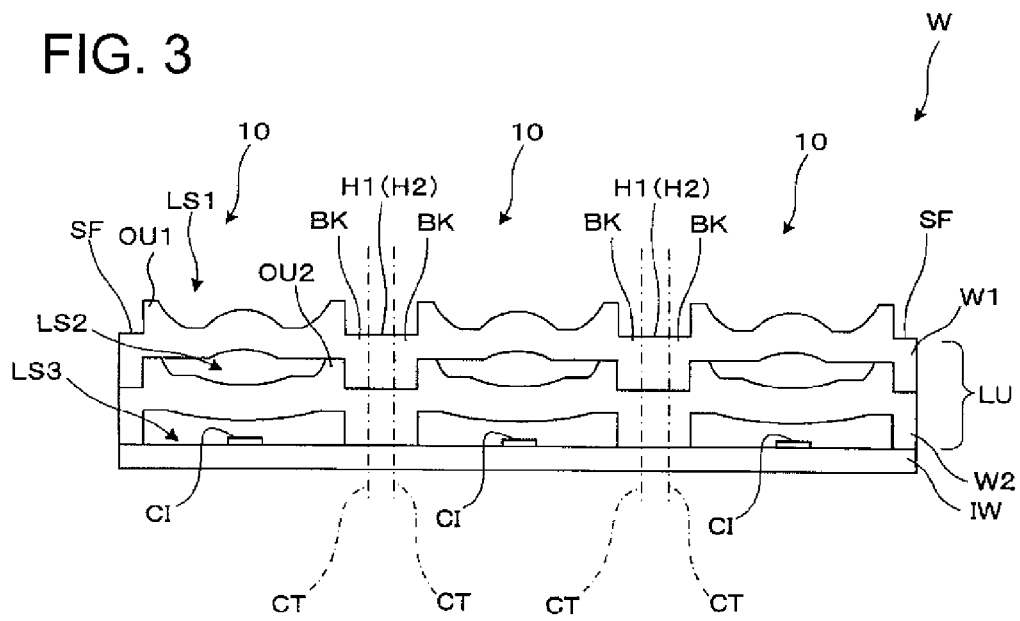
FIG. 3 is a side view in cross-section representing the array dividing step for dividing the optical component array into respective components.

[First Embodiment]
FIGS. 1A and 1B are perspective views representing the outline of the step of manufacturing a camera module as an example of the optical component in the first embodiment. FIGS. 2 and 3 are a plan view and a side view schematically representing the optical component array formed in the step of manufacturing the aforementioned camera module.

As shown in FIGS. 1A and 1B, the optical component array W is made up of the first and second lens arrays W1 and W2 and an image sensor wafer IW as another lamination component. To be more specific, these lamination components are stacked together in the order of the image sensor wafer IW, first lens allay W1 and second lens array W2, and are then bonded with one another using a UV curable resin to be formed into an optical component array W.

Of the arrays W1, W2 and IW constituting the optical component array W, the first array W1 is made up of multiple lenses LS1 arranged in a matrix. As shown in FIGS. 2 and 3, each of the lenses LS1 is made up of a lens body OU1 having a lens curved surface used as an optical system, and a non-optical system portion BK being a peripheral portion of the lens body OU1 and having a non-optical surface not used as an optical system. Further, the second lens array W2 is composed of multiple lenses LS2 arranged in a matrix each corresponding to multiple lens LS1 constituting the first lens array W1. The image sensor wafer IW is configured in such a way that multiple image sensor chips CI correspond to multiple lenses LS1 and LS2, and are arranged in a matrix. Each of the image sensor chips CI is made of photoelectric conversion element or the like, for example, and receives the light that has passed through lens bodies OU1 and OU2. Then each of the image sensor chips CI converts it into an electric signal. This procedure provides a camera module 10 that works as a camera in collaboration with lenses LS1 and LS2.

The camera module 10 is formed separately into a divided form when the optical component array W is cut by a dicing blade DS or the like, as shown in FIG. 1B for example. To put it more specifically, as shown in FIGS. 2 and 3, in the arrays W1, W2 and IW constituting the optical component array W, the cutting allowances H1 and H2 are provided between the portions to be camera modules 10 in the form of a grating, in conformity to the arrangement of multiple lenses LS1 and LS2 and image sensor chip CI provided in a matrix. For example, as shown in FIG. 1B, when an optical component array W is to be cut by a dicing blade DS, the width of the cutting allowance H1 (H2) is determined in conformity to the width of the dicing blade DS. By moving the dicing blade DS in the directions AB and CD where the cutting allowances H1 and H2 are formed, the cutting allowances H1 and H2 are removed. As shown in FIG. 3, this procedure provides separate formation of a triple-layered camera module 10 having square side surfaces and composed of a lens unit LU made up of lenses LS1 and LS2, and an optical element LS3 having an image sensor chip CI, while the cutting lines CT as both ends of the cutting allowance H1 (H2) are assumed as boundaries.

The outermost layer of the camera module 10 formed by dividing the optical component array W, as described above, is the surface of the lens LS1, and is formed of the surfaces of the lens body OU1 and non-optical system portion BK. The manufacturing information of each optical component is printed on the surface of the non-optical system portion BK as a non-optical surface (not illustrated). In the method for manufacturing a plurality of optical components collectively by dividing one optical component array W, the aforementioned printing operation is implemented by the pattern printing step for writing the manufacturing information on individual optical components collectively on such a non-optical surface as the surface SF of the non-optical system portion BK before dividing operation.

Figure 4:
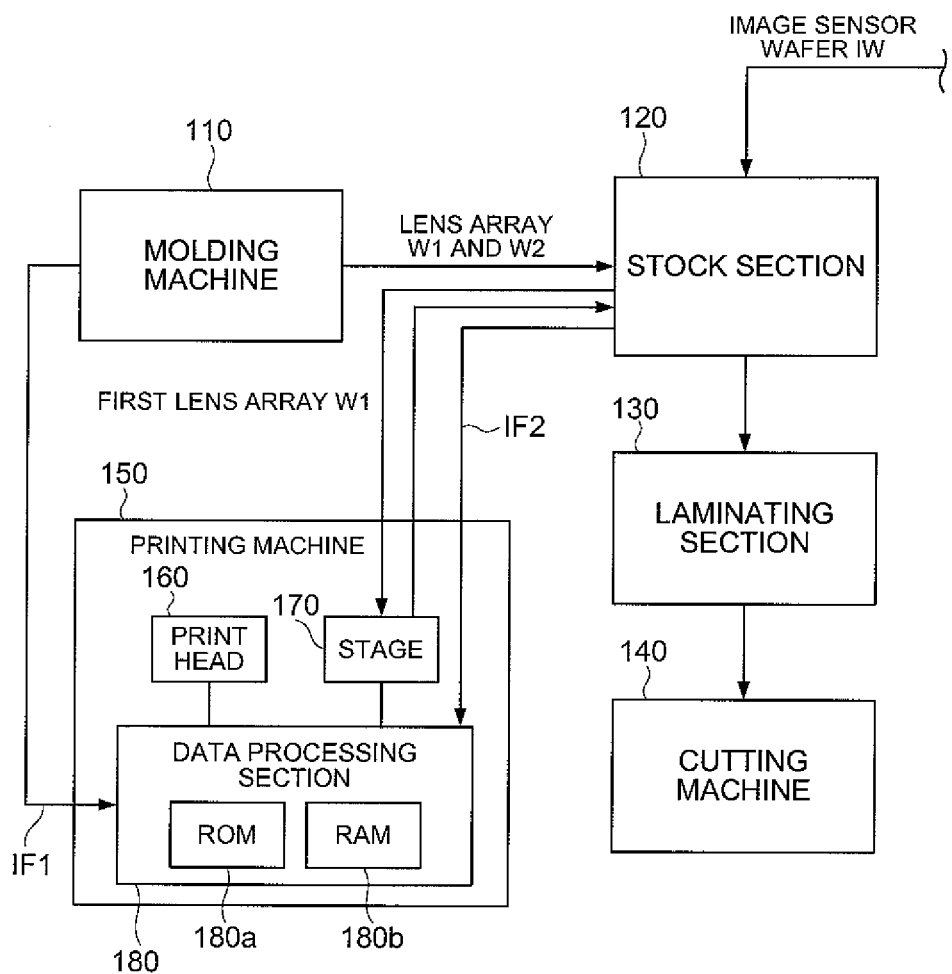
FIG. 4 is a block diagram schematically showing an example of the optical component manufacturing apparatus.
Figure 5:
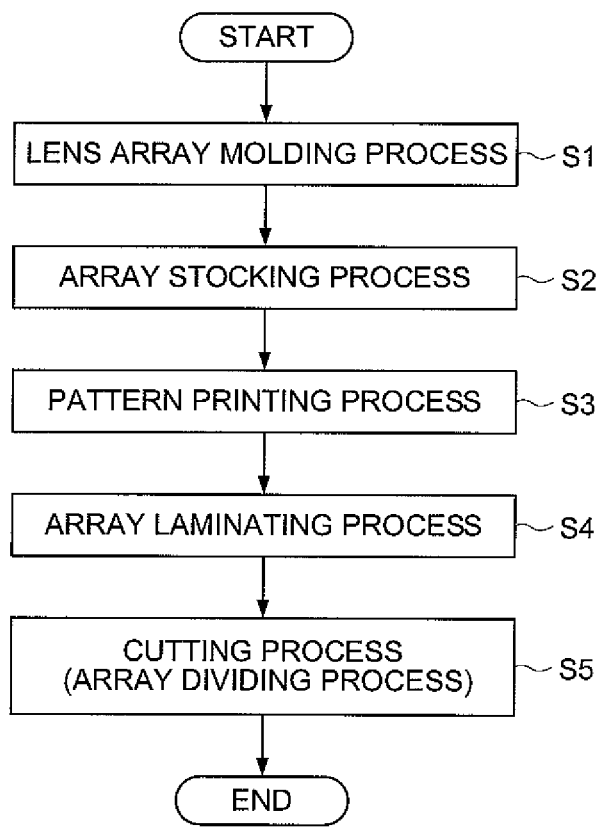
FIG. 5 is a flow chart showing an example of the step for manufacturing optical components.

The following describes the method for manufacturing optical components, and the manufacturing apparatus in the present embodiment. FIG. 4 is a block diagram schematically showing the manufacturing apparatus 100 of the camera module 10 as an example of the optical component. FIG. 5 is a flow chart showing the method of manufacturing the camera module 10 using the manufacturing apparatus 100.

The manufacturing apparatus 100 of the present embodiment includes a molding machine 110 for forming the first and second lens arrays W1 and W2 from an optical material such as a transparent resin or others; a stock section 120 for stocking the first and second lens arrays W1 and W2 formed by the molding machine 110 and the image sensor wafer IW as another lamination components manufactured by a different step (not illustrated), a laminating section 130 for forming an optical component array W, by stacking and bonding the first lens array W1, second lens array W2 and image sensor wafer IW stacked in the stock section 120 (FIGS. 1A and 1B), and a cutting machine 140 far forming individual camera modules 10 by dividing the optical component array W formed by the laminating section 130. The manufacturing apparatus 100 is provided with a printing machine 150 for printing on the first lens array W1, out of each array W1, W2 and IW stocked in the stock section 120, in addition to the aforementioned components essential for production. The printing machine 150 provides a means for printing on the surface SF of the non-optical system portion BK of the first lens array W1 shown in FIG. 2 and others. For example, resin is applied to the surface SF by ink jetting or other means, and is cured, whereby a pattern is printed to indicate various forms of information including the information on each lens of the camera module 10. Accordingly, the printing machine 150 includes a print head 160 for printing the pattern, a stage 170 for mounting the subject to be printed by the print head 160, and a data processing section 180 for collecting information from various portions of the manufacturing apparatus 100 and for processing the information to determine the pattern to be printed. The data processing section 180 is composed of a ROM 180a and RAM 180b, where various forms of information such as character data are stored. Of these, the ROM 180a which can rewrite, but has a data region for storing the information which need not be rewritten in principle in the operation of the manufacturing apparatus 100, as exemplified by various forms of information such as the design information including the version numbers, product names, manufacturers and places of manufacture of various types of optical components, and the orientations of various types of optical components in the optical component array W. In the meantime, the RAM 180b has the data region for storing various forms of information changing as needed along with the operation of the manufacturing apparatus 100 as exemplified by information on the date of manufacturing, lot number, and molding conditions of components. The aforementioned changing information is sent to the data processing section 180 from the molding machine 110 and stock section 120. Based on the information stored in the ROM 180a and RAM 180b, the data processing section 180 determines the details of the pattern to be printed.

In conformity to the flow chart of FIG. 5, the manufacturing apparatus 100 performs the operation of forming a camera module 10. To be more specific, the manufacturing apparatus 100 implements the lens array molding process where the first lens array W1 and second lens array W2 are molded by the molding machine 110 (Step S1). Then the operation proceeds to the army stocking process where the first lens array W1, second lens array W2 and image sensor wafer IW are stored in the stock section 120 (Step S2). In this case, this step determines which of the many arrays W1, W2 and IW having been stored should be selected and laminated. To be more specific, this step determines the combination of the lamination components constituting the optical component array W. Then the operation proceeds to the pattern printing process (Step S3) where a pattern is printed on the first lens array W1 by the printing machine 150, based on the information stored in the ROM 180a and RAM 180b. That is, the specific first lens array W1 is taken out of the stock section 120, and is fed to the stage 170 of the printing machine 150. The pattern is printed by the print head 160 on the non-optical system portion BK positioned around each lens body OU1 of FIG. 2 and others, with respect to the first lens array W1 having been fed onto the stage 170. As the printing method, the pattern is printed onto the surface of the first lens array W1 at one time, for example, by an ink jet. The pattern to be printed corresponds to each of the camera modules 10. As will be described later, after the camera modules 10 has been divided into separate modules by the cutting machine 140, the state is the same as when each printing has been performed for each of the camera modules 10. The first lens array W1 having been printed is again fed back to the stock section 120. Each array W1, W2 and IW for which the combination has been determined are fed to the laminating section 130 from the stock section 120. By laminating each array W1, W2 and IW by the laminating section 130, the array laminating process for forming the optical component array W is implemented (Step S4). In the final stage, the cutting process (array dividing process) is performed, where the optical component array W formed by the laminating section 130 is cut off by the cutting machine 140, and multiple camera modules 10 are formed (Step S5). To be more specific, the cutting machine 140 has a dicing blade DS or others shown in FIG. 1B. This arrangement allows the optical component array W to be divided, and the camera modules 10 are cut out as separate pieces.

Figure 6:
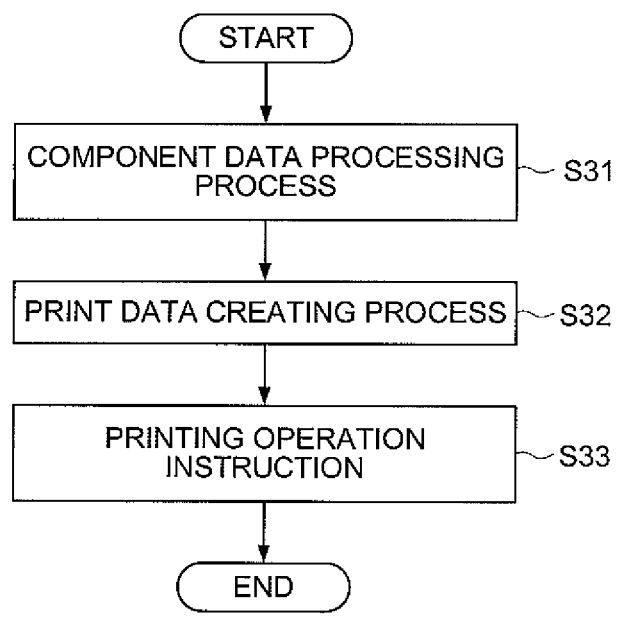
FIG. 6 is a flow chart showing the operation of the printing machine in the optical component manufacturing step.

In the printing operation of Step S3 out of the aforementioned operations of forming the camera modules 10, the pattern to be printed is determined by the data processing of the data processing section 180. FIG. 6 is a flow chart showing the processing of the data processing section 180 as a pre-stage of the printing process of the Step S3 of FIG. 5. As shown in FIG. 6, through the component data processing process for determining the data to be printed (Step S31), the data processing section 180 creates the data to be printed (Step S32), and gives an instruction for printing operation (Step S33). In the aforementioned procedure, the determination of the printed data performed in Step S31 is done according to the information stored in the ROM 180a and RAM 180b, as described above. To put it more specifically, as shown in FIG. 4, the information IF1 inherent to the first lens array W1 and second lens array W2 such as the date when the arrays W1 and W2 are produced in the molding machine 110 is sent from the molding machine 110 to the RAM 180b of the data processing section 180. It is assumed that this signal transmission is implemented after that the required data has been made available. This signal is sent after the arrays W1 and W2 have been formed in the array molding process in Step S1 of FIG. 5. As shown in FIG. 4, the information IF2 on the first lens array W1 stored in the stock section 120, second lens array W2 and image sensor wafer IW to be combined therewith are sent to the RAM 180b of the data processing section 180. In the Step S31 of FIG. 6, the data processing section 280 allows the information IF1 and IF2 to be stored temporarily into the RAM 180b, and checks whether the information is correct or not, according to the collected information. At the same time, the data processing section 280 checks the data in the ROM 180a and RAM 180b to determine the printing contents to be indicated on the camera module 10. As the aforementioned method of checking if the information is correct or not, for example, by obtaining the information on the identification number affixed to the tray for conveying the first lens array W1 of the information IF1 and information IF2, comparison of them is made. The first lens array W1 is identified by this process of checking if the information is correct or not.

Figure 7:
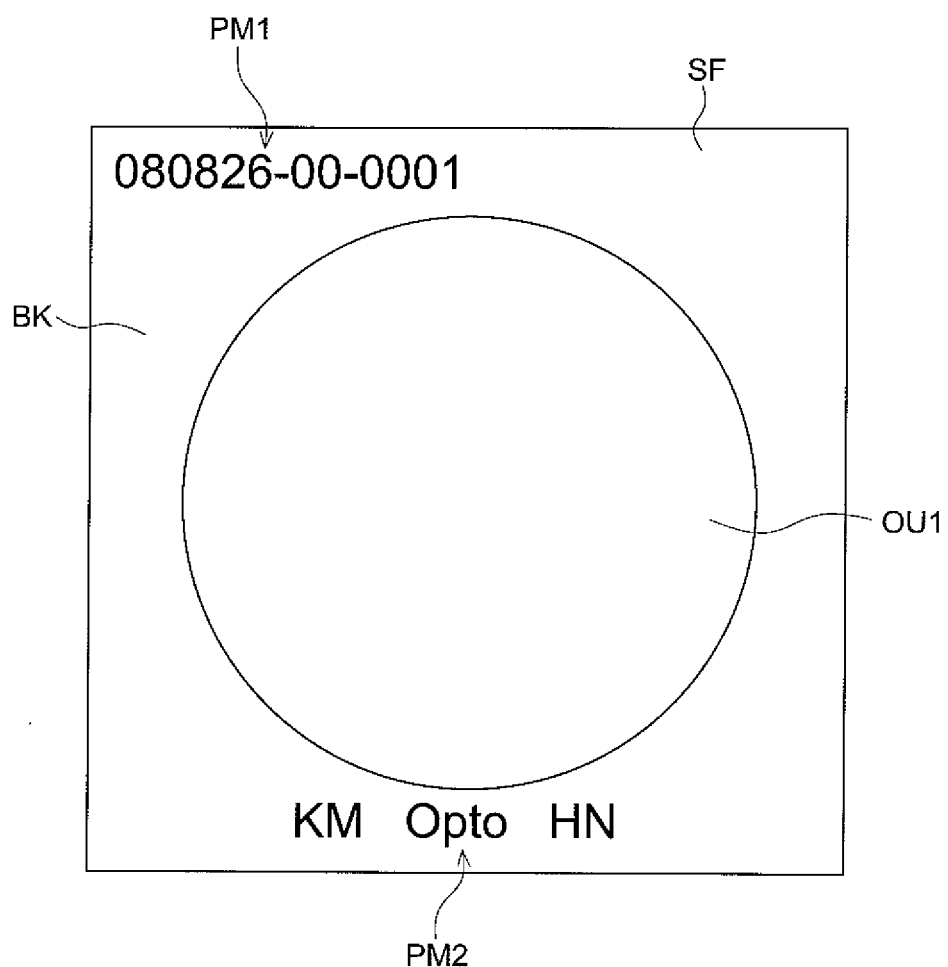
FIG. 7 is a front view showing an example of the optical components having been manufactured.

FIG. 7 is a front view showing an example of the manufactured optical components. In determining the pattern to be printed, as described above, the data processing section 180 owns information on the first lens array W1 having been formed. Thus, as shown in FIG. 7, the information inherent to each of the lens LS1, i.e., each camera module 10 can be included, as the pattern PM1 formed on the surface SF of the non-optical system portion BK of each camera module 10. The pattern PM1 has the information on "date of production/serial number/position prior to cutting" in terms of numerical values. Accordingly, the information on the current position and orientation of the lens LS1 in the first lens array W1 of FIG. 1 or others can be included for each camera module 10. Further, the other information that can be included is such fixed content as the name of the production factory and name of the manufacturer, as shown in the pattern PM2 of FIG. 7. The direction of the camera module 10 can be identified from the position and arrangement of the printed character of the patterns PM1 and PM2. The position and orientation of the camera module 10 when built into each apparatus can be identified from this information, for example.

As described above, in the present embodiment, the pattern to be printed on each camera module 10 is printed at one time onto the surface of the first lens array W1, before the camera modules 10 are divided into respective modules, as shown in Step S3. This arrangement simplifies the information printing procedure, as compared to the case where each one of the camera modules 10 is handled to print the manufacturing information. The pattern to be printed is determined according to the information on the first lens array W1 after having been molded. Thus, the information inherent to each camera module 10 is also included.

[Second Embodiment]

Figure 8:
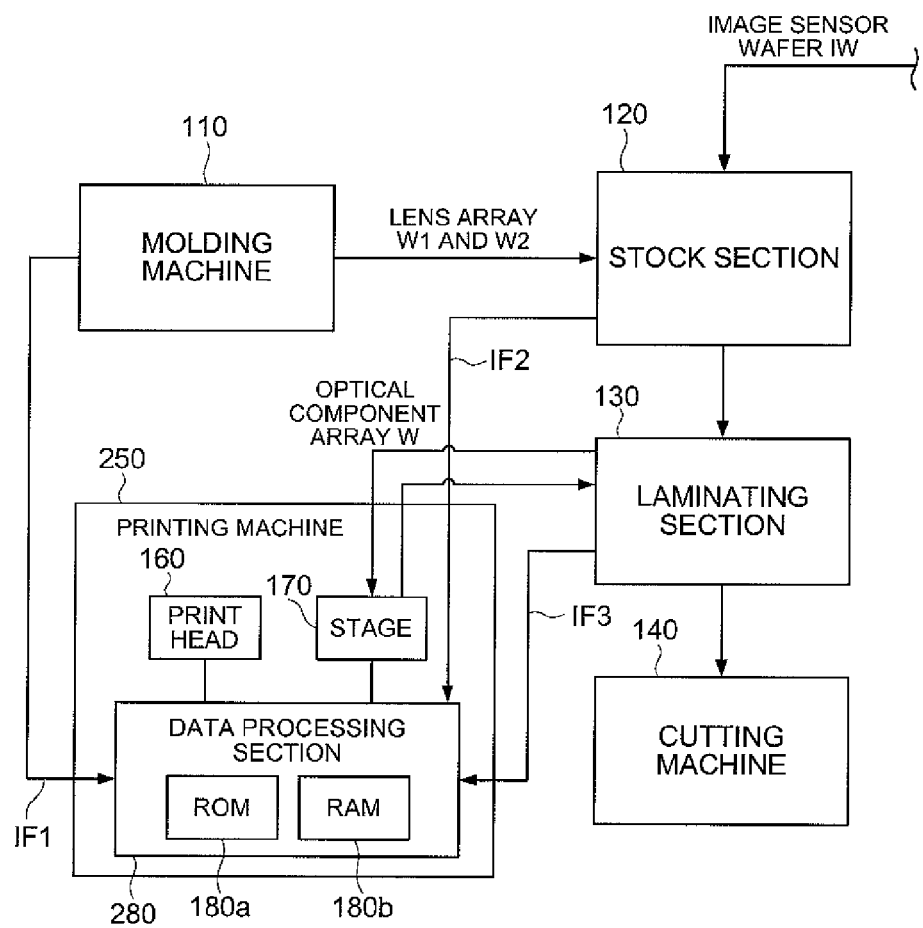
FIG. 8 is a block diagram conceptually showing an example the optical component manufacturing apparatus in the second embodiment.
Figure 9:
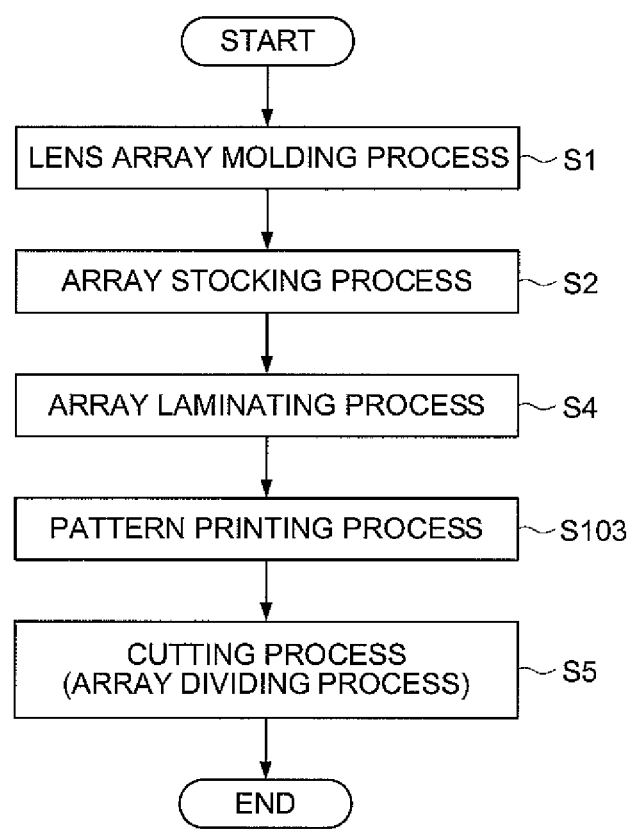
FIG. 9 is a flow chart showing an example of the optical component manufacturing apparatus in the second embodiment.

FIG. 8 shows a block diagram for describing an example the optical component manufacturing apparatus in the second embodiment. FIG. 9 is a flow chart showing a method for manufacturing the camera module using the manufacturing apparatus in the present embodiment. The manufacturing apparatus 200 of the present embodiment is a variation of the manufacturing apparatus 100 of FIG. 4. Thus, the portions assigned with the same reference numbers as the manufacturing apparatus 100 of FIG. 4 have the same operations and functions, and detailed description will be omitted.

Referring to FIG. 8, the following describes the method for manufacturing the optical components, and the manufacturing apparatus in the present embodiment. The manufacturing apparatus 200 of the present invention includes a molding machine 110, stock section 120, laminating section 130, cutting machine 140 and printing machine 250 which prints on the surface of the optical component array W. The printing machine 250 is a printing device to print on the non-optical system portion BK of the first lens array W1 as a surface of the optical component array W of FIG. 2 and others. Here, the printing machine 250 prints various forms of information patterns including the information on each lens of the camera module 10, onto the optical component array W formed by the laminating section 130. Thus, the printing machine 250 is provided with a print head 160, stage 170, and a data processing section 280 for processing information to determine the pattern to be printed. The data processing section 280 in particular collects information from the laminating section 130 as well as the molding machine 110 and stock section 120 among various portions in the manufacturing apparatus 200. The data processing section 280 includes the ROM 180a and RAM 180b. The ROM 180a has a data region for storing the fixed information. The RAM 180b has a data region for storing the information that is subject to a sequential change for each of the components and that stores the information sent from the molding machine 110 stock section 120 and laminating section 130.

Referring to the flowchart of FIG. 9, the following describes the operation of the manufacturing apparatus 200 for forming the camera module 10. In the first place, in the manufacturing apparatus 200, the first lens array W1 and second lens array W2 are formed by the molding machine 110 (Step S1), similarly to the case of the manufacturing apparatus 100 of FIG. 4. The first lens array W1, second lens array W2 and image sensor wafer IW are stacked in the stock section 120 (Step S2). Further, in the manufacturing apparatus 200 of FIG. 8, the optical component array W is formed from arrays W1, W2 and IW in the laminating section 130 (Step S4). The information IF1 through IF3, in the Steps S1, S2 and S4, on the first lens array W1, second lens array W2 and image sensor wafer IW and optical component array W formed by laminating these W1, W2 and IW is sent to the RAM 180b of the data processing section 280. The data processing section 280 checks whether the information is correct or not, by comparison of the information on the first lens array W1 obtained from the information IF1 through IF3, for example. Further, the data processing section 280 determines the pattern to be printed and indicated on each camera module 10 from the data in the ROM 180a and RAM 180b. In the meantime, the optical component array W formed in Step S4 moves from the laminating section 130 onto the stage 170 of the printing machine 250. With respect to the optical component array W moved onto the stage 170, the pattern of the content determined in the aforementioned step is printed on the surface SF of the non-optical system portion BK of each camera module 10 shown in FIG. 2 and others, using the print head 160 (Step S103). In the final stage, the optical component array W laminated by the laminating section 130 and provided with the printed pattern by the printing machine 250 is cut off by the cutting machine 140, whereby multiple camera modules 10 are formed (Step S5).

As described above, in the present embodiment, the pattern including the information on each lens is printed on the optical component array W laminated using the arrays W1, W2 and IW. In this case as well, the pattern is printed onto the surface of the optical component any W at one time. Thus, this procedure simplifies the printing of information, similarly to the case of the first embodiment. At the same time, the pattern including the information inherent to each camera module 10 can be printed on each of the camera modules 10. Especially in the present invention, information on the combination of the arrays W1, W2 and IW, that is, the information on the optical component array W can be indicated on each camera module 10.

[Third Embodiment]

Figure 10:
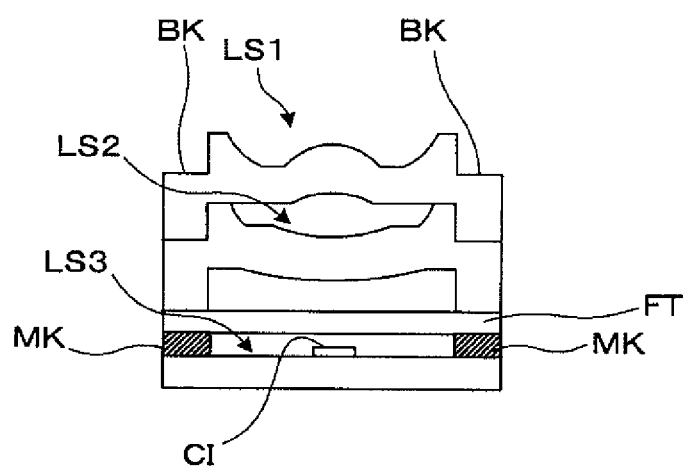
FIG. 10 is a side view in cross-section showing the camera module in the third embodiment.

FIG. 10 is a side view in cross-section showing the camera module as an optical component in the third embodiment. The camera module 310 of the present invention is a variation of the camera module 10 of the first embodiment and the like. A filter member FT for filtering out light of a prescribed wavelength range is provided between the lens LS2 and the optical element section LS3 having an image sensor chip CI. An example of the filter member FT will be specifically described below. The filter member FT is an infrared absorption filter for absorbing infrared light. This filter removes the unwanted infrared light from the light having passed through the lenses LS1 and LS2, thereby preventing the image of the image sensor chip CI from being deteriorated. As described above, the camera module 310 includes the filter member FT for removing infrared light in addition to the optical element section LS3 including a lens LS1, lens LS2 and image sensor chip CI. This structure provides more advanced camera functions. To prevent the filter member FT from coming in contact with the image sensor chip CI, a mask MK is formed around the image sensor chip CI.

In the step of manufacturing the camera module 310 of the present embodiment, films to be made into the mask MK and filter member FT should be formed on the image sensor wafer IW in advance before lamination of the optical component array W of FIGS. 1A and 1B, for example. In this case, when forming an individual camera module 310 by dividing the optical component array W, the mask MK and filter member FT are also divided to be formed as components inside the camera module 310. In this case, therefore, the operation in the manufacturing step of the pattern printing can be performed in the same way as in the first embodiment.

Although the present invention has been fully described with reference to each embodiment, the present invention is not restricted thereto.

In the first place, a triple layer structure is used in the aforementioned embodiments. The present invention is also applicable to the optical components having a further multilayer structure or double-layer structure.

In the aforementioned description, camera modules are manufactured as the optical components. However, the optical components to be produced can be other components than the camera module. For example, if the aforementioned embodiment is applied to the optical component array of a double layer structure made up of the first lens array W1 and second lens array W2 in FIG. 1A, a lens unit of double-layer structure can be produced. In this case, the pattern including the information on the lens unit to be formed will be printed on the non-optical system portion of the surface of any one of the first lens array W1 as a lens array and the second lens array W2 as another lamination component. To be more specific, the lens unit has the manufacturing information thereof printed on the non-optical system portion. Similarly, a lens having the manufacturing information thereof printed on the non-optical system portion can be produced by using the aforementioned embodiments.

Further, a pattern can be printed on the surfaces on each of the arrays W1 and W2 by various methods in addition to the method of using the ink jet, if printed on the entire surface. For example, a pattern can be formed by laser-processing of the surface SF of the non-optical system portion BK.

Optical components can be cut by various methods in addition to the method of using a dicing blade. For example, the laser, holesaw and end milling tool can be used for cutting.

DESCRIPTION OF SYMBOLS

W . . . Optical component array
W1, W2 . . . Lens array
IW . . . Image sensor wafer
LS1, LS2 . . . Lens
CI . . . Image sensor chip
10, 310 . . . Camera module
FT . . . Filter member
100, 200 . . . Manufacturing apparatus
110 . . . Molding machine
120 . . . Stock section
130 . . . Laminating section
140 . . . Cutting machine
150, 250 . . . Printing machine
180, 280 . . . Data processing section

What is claimed is:

1. A manufacturing method for an optical component for producing an individual optical component by dividing a laminated optical component array into individual optical components, the laminated optical component array including a lens array which has a plurality of lenses arranged thereon and the method comprising the steps of:
   molding the lens array from an optical material;
   procuring the optical component array by attaching the lens array on another lamination component;
   dividing the optical component array into individual components; and
   printing a pattern which includes information related to each lens in the lens array on a non-optical surface existing around the each lens during the steps from molding the lens array to dividing the optical component array.

2. The manufacturing method for an optical component of claim 1,
   wherein the optical component array comprises:
   a first lens array as the lens array; and
   a second lens array as the another lamination component, which has a plurality of lenses corresponding to each lens of the first lens array,
   wherein in the pattern printing step, the pattern including information related to each lens unit corresponding to the each lens is printed on the non-optical surface existing around the each lens of at least one of the first and the second lens arrays.

3. The manufacturing method for an optical component of claim 1,
   wherein the optical component array comprises:
   the lens array; and
   an image sensor wafer as the another lamination component, which includes a plurality of image sensor chips arranged thereon, each of which corresponds to each lens of the lens array and constitutes each camera module in collaboration with the each lens, and
   wherein in the pattern printing step, the pattern including information related to the each camera module corresponding to the each lens of the lens array is printed on the non-optical surface existing around the each lens.

4. The manufacturing method for an optical component of claim 1,
   wherein the optical component array is formed by further attaching a filter member for cutting off incident light in a prescribed wavelength region, on the optical component array.

5. The manufacturing method for an optical component of claim 1,
   wherein in the pattern printing step, the pattern including various pieces of information is printed by applying resin to the non-optical surface existing around the each lens and curing the resin.

6. The manufacturing method for an optical component of claim 1,
wherein in the pattern printing step, the pattern including various pieces of information is printed by laser-processing of the non-optical surface existing around the each lens.

7. The manufacturing method for an optical component of claim 1, further comprising:
collecting information created in at least one of the lens array molding step and the optical component array procuring step;
creating printing data based on the collected information;
wherein the information is printed on the non-optical surface existing around the each lens in the pattern printing step by using the created printing data.

8. The manufacturing method for an optical component of claim 1,
wherein the information printed on the non-optical surface existing around the each lens in the pattern printing step includes information on a layout position of the each lens in the lens array.

9. A lens which has the pattern including the information related to the each lens as own manufacturing information, by being formed by using the manufacturing method of claim 1.

10. A lens unit which has the pattern including the information related to the each lens as own manufacturing information, by being formed by using the manufacturing method of claim 1.

11. A camera module which has the pattern including the information related to the each lens as own manufacturing information, by being formed by using the manufacturing method of claim 1.

12. The manufacturing method for an optical component of claim 7,
wherein the information printed on the non-optical surface existing around the each lens in the pattern printing step includes information on a layout position of the each lens in the lens array.

13. The manufacturing method for an optical component of claim 7,
wherein the collected information includes information which changes according to a manufacturing operation in at least one of the lens array molding step and the optical component array procuring step.

* * * * *